ary Examiner# United States Patent Office 3,499,241
Patented Mar. 10, 1970

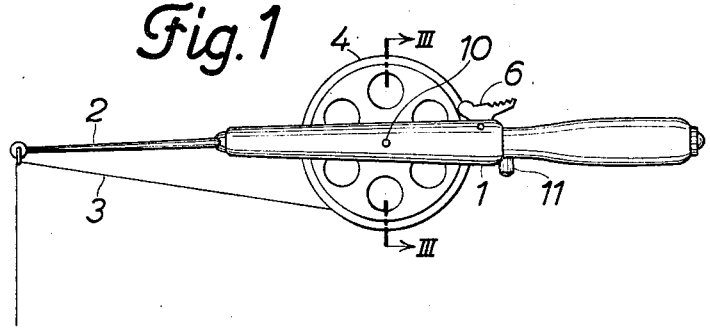
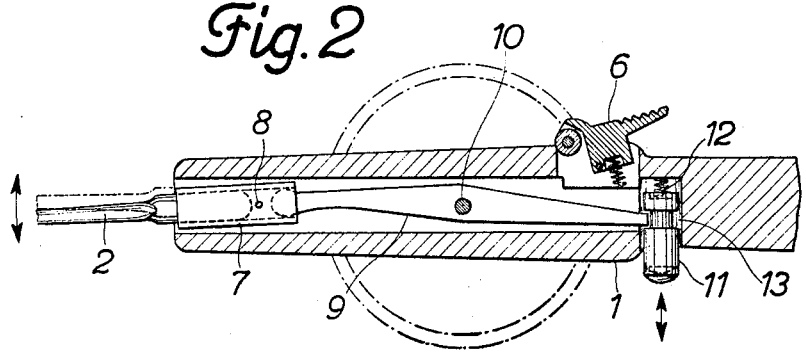
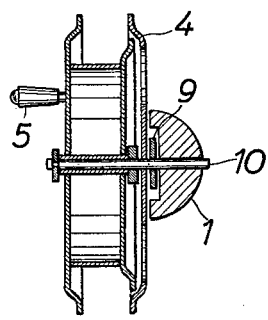

3,499,241
FISHING GEAR
Aaro Arvo Ruppa, Kohnionkatu 75,
Jyvaskyla, Finland
Filed Apr. 12, 1968, Ser. No. 720,934
Claims priority, application Finland, Dec. 28, 1967,
3,464/67
Int. Cl. A01k 89/02
U.S. Cl. 43—19.2                                  3 Claims

ABSTRACT OF THE DISCLOSURE

Fishing gear having a grip part and a rod turnably pivoted in this grip part, and in which the bait is moved by mediation of the line, by repeatedly pressing an actuating lever placed in the grip part. Between the actuating lever and the rod there is journalled in the grip part a two-armed transmission lever, one arm of which engages the actuating lever and the other arm engaging the rod.

---

A fishing gear is previously known, according to which the bait is caused to tremble. For this purpose a toothing has been provided on the rod and along this toothing is passed a pin connected by means of a linkage rod to an actuating lever. It has been found in practice, however, that owing to the elastic stretching ability of the line and to the resistance of water no trembling motions of any kind are transferred to the bait. On the other hand it has been found that the pin tends to become locked between two of the teeth on the rod. If one succeeds to move the pin along the tooth rack by applying great force, an objectionable noise is produced.

An object of the present invention is to provide fishing gear which is not meant to produce any trembling motions of the bait but rather appropriate tugs, which correspond to the movements of small fish. A fishing gear according to the invention is characterized in that between the actuating lever and the rod there is journalled in the grip part a transmission lever having two arms, one of its arms engaging the actuating lever and the other arm engaging the rod. Thus at each depression of the actuating lever a sharp tug is produced, which imparts to the bait a movement simulating the movement of small fish. Experiments have shown that the components of the actuating mechanism should be most appropriately so dimensioned that the tip of the rod moves about 3-4 cm. when the actuating lever is depressed.

According to the invention the rod is constructed as a two-armed lever. In this manner the movement of the actuating lever can be most directly transferred to the tip of the rod, and in this instance the actuating lever, the two-armed transmission lever and the rod are on each other's immediate extensions.

The invention is described hereafter with reference to the attached drawing, wherein:

FIG. 1 shows a fishing gear according to the invention in elevational view,

FIG. 2 shows the same fishing gear in longitudinal section and drawn to larger scale, and FIG. 3 is a section taken along line III—III in FIG. 1.

A fishing gear according to the invention comprises a hollow grip part 1, a rod 2, a line 3 and a line reel 4. The reel 4, which is rotated by means of the knob 5, is countersunk in the grip part 1. Braking of the rotation of the reel 4 is accomplished by means of a spring-loaded brake 6 journalled in the grip part 1.

The rod 2 is press-fit in a sleeve 7, which is carried on a shaft 8 close to the front end of the grip part 1. Into the opposite end of the sleeve 7 there is press-fit a two-armed transmission lever 9, which is journalled on a shaft 10 of the line reel 4. The opposite end of the two-armed transmission lever 9 engages an annular groove 13, in actuating lever 11 so that the actuating lever 11 cannot fall out. The actuating lever 11 is urged outward by a pressure spring 12. When the actuating lever 11 is pressed inward e.g. with the index finger, the two-armed transmission lever 9 turns around its shaft 10 in counter-clockwise direction and simultaneously sleeve 7 and rod 2 turn in clockwise direction about shaft 8; the tip of the rod is thereby jerked upward a few centimetres and thus exerts a tug on the bait through the intermediary of the line 3.

In the fishing gear according to the invention, the mechanism required to move the bait is rather simple by virtue of the fact that the sleeve 7 has been designed as a two-armed lever and that the two-armed transmission lever 9 has been journalled on a common shaft with the line reel 4.

What is claimed is:
1. An improvement in fishing gear provided with a grip part and a rod turnably journalled in the grip part, and in which a baited fishing line is moved by movement of the rod by repeatedly depressing an actuating lever placed in the grip part, wherein the improvement comprises in that between the actuating lever and the rod there is journalled in the grip part a two-armed transmission lever, one arm of which operably engages the actuating lever, the other arm engaging the rod.
2. Fishing gear according to claim 1, wherein the rod is journalled intermediate its ends in the grip part to provide a two-armed lever.
3. Fishing gear according to claim 1 provided with a line reel having a shaft, the two-armed transmission lever being journalled on the shaft of the line reel.

References Cited

UNITED STATES PATENTS

| 2,065,153 | 12/1936 | Proudfit | 43—19 X |
| 2,483,071 | 9/1949 | Stine | 43—18 |
| 2,593,885 | 4/1952 | James | 43—19 |
| 2,799,112 | 7/1957 | Wilson | 43—19.2 |

FOREIGN PATENTS

| 208,817 | 11/1966 | Sweden. |

WARNER H. CAMP, Primary Examiner